United States Patent
Brnada

(10) Patent No.: US 10,153,692 B2
(45) Date of Patent: Dec. 11, 2018

(54) METHOD AND APPARATUS FOR PROVIDING SUPPLEMENTAL POWER IN A LED DRIVER

(71) Applicant: GE LIGHTING SOLUTIONS, LLC, East Cleveland, OH (US)

(72) Inventor: Josip Brnada, Willoughby, OH (US)

(73) Assignee: GE Lighting Solutions, LLC, East Cleveland, OH (US)

( * ) Notice: Subject to any disclaimer, the term of this patent is extended or adjusted under 35 U.S.C. 154(b) by 105 days.

(21) Appl. No.: 14/997,452

(22) Filed: Jan. 15, 2016

(65) Prior Publication Data
US 2016/0134188 A1    May 12, 2016

Related U.S. Application Data

(63) Continuation of application No. PCT/US2014/043359, filed on Jun. 20, 2014, which
(Continued)

(51) Int. Cl.
*H05B 33/00* (2006.01)
*H02M 3/156* (2006.01)
(Continued)

(52) U.S. Cl.
CPC ............ *H02M 3/156* (2013.01); *H02M 1/12* (2013.01); *H02M 1/4225* (2013.01); *H02M 1/44* (2013.01);
(Continued)

(58) Field of Classification Search
CPC ............ H05B 33/0803; H05B 33/0815; H05B 33/083; H02M 3/156
See application file for complete search history.

(56) References Cited

U.S. PATENT DOCUMENTS 6,335,575 B1 * 1/2002 Reutlinger ............ H02J 7/1423
307/10.1
6,775,162 B2    8/2004 Mihai et al.
(Continued)

FOREIGN PATENT DOCUMENTS

CN    102427638 A    4/2012
CN    102695997 A    9/2012
(Continued)

OTHER PUBLICATIONS

International Search Report and Written Opinion issued in connection with corresponding Application No. PCT/US14/43359 dated Oct. 10, 2014.
(Continued)

*Primary Examiner* — Monica C King
(74) *Attorney, Agent, or Firm* — Peter T. DiMauro; GE Global Patent Operation

(57) ABSTRACT

A DC current driver includes a DC current drive circuit configured to provide a DC supply current and receive a DC return current. A switch is coupled in series with the DC return current, and a supplemental power supply is coupled in parallel with the switch and configured to provide a supplemental voltage. Opening the switch diverts the DC return current through the supplemental supply and closing the switch causes the DC return current to bypass the supplemental supply.

20 Claims, 6 Drawing Sheets

Related U.S. Application Data is a continuation of application No. 13/943,235, filed on Jul. 16, 2013, now abandoned.

(51) Int. Cl.
   *H05B 33/08* (2006.01)
   *H02M 1/12* (2006.01)
   *H02M 1/42* (2007.01)
   *H02M 1/44* (2007.01)
   *H02M 1/00* (2006.01)

(52) U.S. Cl.
   CPC ....... *H05B 33/0803* (2013.01); *H05B 33/083* (2013.01); *H05B 33/0815* (2013.01); *H02M 2001/008* (2013.01); *Y02B 70/126* (2013.01)

(56) References Cited

U.S. PATENT DOCUMENTS

| | | |
|---|---|---|
| 8,242,710 B2 | 8/2012 | Radermacher et al. |
| 2004/0041526 A1 | 3/2004 | Vollrath |
| 2006/0261746 A1 | 11/2006 | Huang et al. |
| 2007/0076375 A1 | 4/2007 | Mongia |
| 2008/0024099 A1 | 1/2008 | Oki et al. |
| 2011/0065161 A1 | 3/2011 | Kwasinski et al. |
| 2012/0051757 A1 | 3/2012 | Nishino et al. |
| 2012/0112657 A1 | 5/2012 | Van Der Veen et al. |
| 2012/0286691 A1 | 11/2012 | Jesme |
| 2012/0319612 A1 | 12/2012 | Weil et al. |
| 2012/0326508 A1* | 12/2012 | Roberts ............... H05B 33/083 307/36 |
| 2013/0038242 A1 | 2/2013 | Athalye |
| 2013/0049610 A1 | 2/2013 | Chen |
| 2013/0154494 A1* | 6/2013 | Hoogzaad .......... H05B 33/0818 315/210 |
| 2014/0125236 A1 | 5/2014 | Szczeszynski et al. |
| 2014/0211192 A1 | 7/2014 | Grootjans et al. |
| 2014/0239810 A1 | 8/2014 | Martin-Lopez et al. |
| 2014/0239834 A1 | 8/2014 | Choi et al. |

FOREIGN PATENT DOCUMENTS

| | | |
|---|---|---|
| JP | 2006050894 A | 2/2006 |
| JP | 2006340471 A | 12/2006 |
| JP | 2010142111 A | 6/2010 |
| JP | 2010532092 A | 9/2010 |
| JP | 2011150936 A | 8/2011 |
| WO | 2011104106 A1 | 9/2011 |
| WO | 2013150399 A1 | 10/2013 |

OTHER PUBLICATIONS

Machine translation and Office Action issued in connection with corresponding JP Application No. 2016-528001 dated Mar. 20, 2018.

Unofficial English Translation of Chinese Office Action issued in connection with corresponding CN Application No. 201480040616.X dated Dec. 13, 2016.

* cited by examiner

METHOD AND APPARATUS FOR PROVIDING SUPPLEMENTAL POWER IN A LED DRIVER

This application is a continuation of International Application No. PCT/US2014/043359, filed on 20 Jun. 2014, which claims priority from U.S. patent application Ser. No. 13/943,235, filed on 16 Jul. 2013, now abandoned, both of which are hereby incorporated by reference in their entireties.

FIELD

The aspects of the present disclosure relate generally to LED light sources, and in particular to DC drive circuits used for LED lamps.

DESCRIPTION OF RELATED ART

A light emitting diode (LED) is an electric light source constructed from semiconductor materials, often gallium arsenide and/or gallium nitride. Like other diodes, a light emitting diode is created by doping the semiconductor material with various impurities to create a p-n junction. When current is applied to the LED, charge carriers flow into the p-n junction, where positively charged holes combine with negatively charged electrons causing the electrons to fall to lower energy levels thereby releasing energy as light. As in all diodes, current flows easily from the positively doped p-side to the negatively doped n-side of the device, but not in the opposite direction. Therefore, LEDs are typically driven from a direct current (DC) power source.

In many applications, such as domestic lighting and street signaling, DC power may not be readily available, and drive circuits are used to convert the locally available AC grid power into regulated DC power to drive the LED lamps. It is important for these drive circuits to be energy efficient, small in size, and low cost. Drive circuits used in building lighting and street signaling applications are also subject to government regulations and must meet strict requirements, which among other factors, limit allowable EMI emissions.

Rising energy costs have created a demand for energy efficient replacement lighting devices that conform to the same form factor and electrical requirements as older incandescent light bulbs, such as those constructed on the ubiquitous Edison screw base. As LED replacement lamps get higher in wattage, it becomes necessary to incorporate cooling into the package along with the drive circuitry and LED lamps. Sub-drivers or supplemental supplies are often added to the drive circuitry to provide secondary power for cooling systems or other functionality requiring low level power. For example, in drive circuits that use a boost type switching regulator to provide LED drive current, additional windings are sometimes added to the energy storage inductor to draw power for the supplemental supplies. However, drive circuits are typically optimized for the required LED drive current and addition of supplemental supplies often results in undesired side effects, such as EMI emissions in excess of the regulatory limits. Thus, it becomes challenging to deliver a drive circuit that is cost effective, has high electrical efficiency, small form factor, and acceptable EMI performance. This challenge is further complicated by the need to incorporate supplemental power for secondary loads such as a cooling system, or other low level circuitry that provides additional features In many applications it is desirable to regulate the supplemental supply output at a generally constant level. FIG. 6 illustrates an embodiment of a typical prior art non-inverting hysteretic comparator circuit 600 that may be used in a supplemental power control circuit to provide regulation of the output power. The comparator circuit 600 compares a reference voltage Vref with an input voltage Vin and produces a switch control signal Vout that may be used to operate a power switching device to regulate the supplemental power. A control voltage Vcc is used to power an operational amplifier or op-amp 601 and is also used to create a reference voltage Vref through a resistor divider network that includes resistors R206 and R106. The reference voltage is then applied to the inverting input of op-amp 601. A sensing signal Vin is received by the comparator circuit 600 where the sensing signal Vin is proportional to a supplemental supply voltage being controlled by the comparator circuit 600. Sensing signal Vin is applied to the non-inverting input of op-amp 601 through a pair of resistors R306 and R506. A feedback resistor R406 connects the output voltage Vout to the non-inverting input of the op-amp 601. Circuit ground for the comparator circuit is represented by the ground symbol 604.

In operation the comparator circuit 600 produces a switch control signal Vout such that the sensing signal Vin is maintained at a generally constant value. When used to drive a push-pull type output stage the switch control signal Vout has only two states: $V_{out_L}$ and $V_{out_H}$, where $V_{out_L}$ is equal to circuit ground 604 and $V_{out_H}$ is equal to the control voltage Vcc. When the sensing signal exceeds a high switching voltage $V_{in_H}$ the switch control signal Vout drops to $V_{out_L}$ and when the sensing signal Vin falls below a low switching voltage $V_{in_L}$ the switch control signal is set to $V_{out_H}$. The high switching voltages $V_{in_H}$ and $V_{in_L}$ are functions of the reference voltage Vref and the switch control signal as shown in equation 1 and equation 2:

$$Vin_H = \frac{(R5*R3 - R5*R3 + R3*R4)*Vref - R5*R3*Vout_L}{R5*R4},$$ (Equation 1)

$$Vin_L = \frac{(R5*R3 - R5*R3 + R3*R4)*Vref - R5*R3*Vout_H}{R5*R4}.$$ (Equation 2)

High frequency noise around the switching points is prevented by including hysteresis in the circuit. The amount of hysteresis is given by equation 3 as:

$$Hystereses = \frac{R3*(Vout_H - Vout_L)}{R4}.$$ (Equation 3)

Equations 1, 2, and 3 may be used to design a circuit having the desired switching voltages $V_{in_H}$ and $V_{in_L}$ with a suitable amount of Hysteresis.

Accordingly, it would be desirable to provide an LED drive circuit that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a DC current driver. In one embodiment, the DC current driver includes a DC current drive circuit configured to provide a DC supply current and receive a DC return current, a switch coupled in series with the DC return current, and a supplemental power supply coupled in parallel with the switch and configured to provide a supplemental voltage. Opening the switch diverts the DC return current through the supplemental supply and closing the switch causes the DC return current to bypass the supplemental supply.

Another aspect of the exemplary embodiments relates to a LED lighting apparatus. In one embodiment, the LED lighting apparatus includes a LED lamp that has one or more light emitting diodes, a driver circuit coupled to the LED lamp and configured to provide a LED supply current to the LED lamp and to receive a LED return current from the LED lamp, a switch coupled in series with the LED return current, and a supplemental supply configured to receive the LED return current and produce a supplemental voltage. Opening the switch causes the LED return current to flow through the supplemental power circuit and closing the switch causes the LED return current to bypass the supplemental power circuit.

Another aspect of the exemplary embodiments relates to a method for providing a supplemental voltage in a DC current driver. In one embodiment, the method includes producing a DC supply current with the DC current driver, receiving a DC return current with the DC current driver, placing a switch in series with the DC return current, opening the switch to divert the DC return current through a supplemental supply circuit, closing the switch to have the DC return current bypass the supplemental supply circuit, and using the supply circuit to generate a supplemental voltage from the DC return current.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 1:
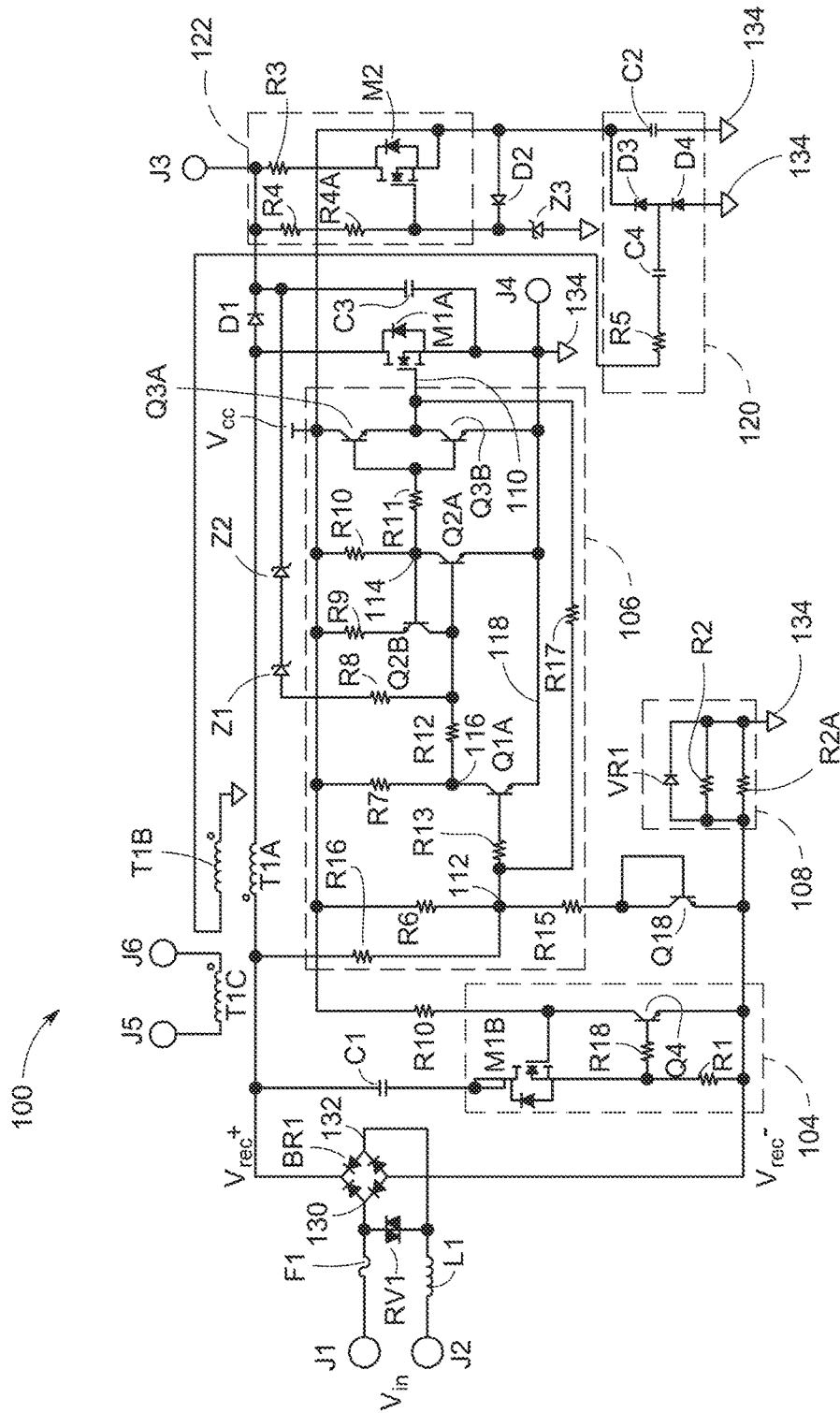
FIG. 1 illustrates a schematic diagram of one embodiment of a LED drive circuit configured to provide supplemental power using a secondary winding on the energy storage inductor.

FIG. 1 illustrates a schematic diagram of an exemplary LED drive circuit or driver, generally indicated by reference 100, as may be used to provide DC power to a LED type lamp. The LED drive circuit 100 is configured to receive AC input power, Vin, across input terminals J1 and J2 where the input power Vin may be any suitable AC power such as for example, the locally available grid power, 120 volt (V) 60 Hertz (Hz) power generally available in North America or the 230V 50 Hz power available in many European countries, or other suitable AC power sources. The AC input power Vin is converted to DC power, illustrated as $V^+_{rec}$, $V^-_{rec}$, by a diode bridge BR1 where one bridge input 130 is connected to the AC input terminal J1 through a series connected fuse F1 and the other bridge input 132 is connected to the other AC input terminal J2 through a series connected inductance L1. Fuse F1 protects the LED drive circuit 100 from excessive current. A metal oxide varistor (MOV) RV1 coupled across the bridge inputs 130 and 132 protects circuitry such as the diode bridge BR1 from surges in the input power which could otherwise damage the LED drive circuit 100. Inductor L1 is used to reduce EMI emissions. Further EMI reduction can be provided by a filter capacitor C1 connected across the DC power $V^+_{rec}$, $V^-_{rec}$ through an inrush current protection or limiting circuit 104. The inrush current protection circuit 104 connects one side of the filter capacitor C1 to $V^-_{rec}$ and includes a metal oxide semiconductor field effect transistor (MOSFET) M1B coupled in series with resistor R1 to limit inrush current to a safe amount. The gate voltage of MOSFET M1B is controlled by a circuit including resistor R18, bipolar junction transistor (BJT) Q4, and resistor R10 where the gate of MOSFET M1B is connected to the collector of BJT Q4 and to a control voltage Vcc through resistor R10. The base of BJT Q4 is connected to the source of MOSFET M1B and connected to $V^-_{rec}$.

LED drive current is regulated by a boost type switching regulator comprised of an energy storage inductor T1A coupled in series with a freewheeling diode D1 and a boost switch MOSFET M1A coupling the inductor T1A to circuit common 134. The LED drive circuit 100 provides DC power across terminals J3 and J4 and the drive power is stabilized by a filter capacitor C3 coupled in parallel across the terminals J3 and J4. When a load is connected across the terminals J3 and J4 thereby completing the circuit, a DC current will flow out of terminal J3, through the load, and back into terminal J4. Using standard current polarity convention, where positive current is defined as flowing in the opposite direction of electron flow, as used herein the current flowing out of terminal J3 is the DC supply current $I_S$ and the current flowing into terminal J4 is the DC return current $I_R$. In certain embodiments the load connected across DC power terminals J3 and J4 includes a suitable LED lamp assembly (not shown). When the load includes an LED lamp, the DC supply current $I_S$ is referred to herein as a LED supply current, and the DC return current is referred to as a LED return current. Alternatively, other types of loads requiring a regulated DC power may also be advantageously connected across terminals J3 and J4. The DC return current $I_R$ flowing into terminal J4 flows through circuit common 134 to a current sensing circuit 108 before returning to the diode bridge BR1. DC return current $I_R$ is converted to a proportional voltage in the current sensing circuit 108 by a pair of resistors R2 and R2A, referred to as sensing resistors, which are connected in parallel with each other. A diode VR1 is coupled in parallel with sensing resistors R2 and R2a to provide voltage protection for the sensing resistors R2, R2A. In certain embodiments where it is desirable to use a lower wattage LED lamp assembly, only one sensing resistor R2 can be used and the other sensing resistor R2A can be removed.

A self-oscillating switching control circuit 106 supplies a switch drive signal 110 to the gate of the boost switch M1A. The switch drive signal 110 is generated by a buffer circuit including a pair of complementary bipolar junction transistors Q3A and Q3B. The n-p-n transistor Q3A is shown connected between the control voltage Vcc and the switching control signal 110 and p-n-p transistor Q3B is shown connected between the switching control signal 110 and circuit common 134. Control current is applied to the base of both transistor Q3A and transistor Q3B through a resistor R11. A set point 112 is generated by a resistor divider network including resistors R6 and R15 and a complementary transistor Q18 coupled in series between the control voltage Vcc and the negative dc voltage at V$^-$. The complementary transistor Q18 is coupled in series with the resistor divider R6, R15 to offset the diode drop across transistor Q1A.

Input voltage at $V_{rec}^+$ is included in the setpoint 112 through resistor R16 to improve total harmonic distortion of the LED driver circuit 100. A summing circuit including BJT Q1A, resistor R13, and resistor R7 combines the setpoint 112 with the sense resistor voltage 118, on circuit node 118, to create a switching control signal at circuit node 116. The sense resistor voltage 118 is created by the LED return current $I_R$ flowing through the sensing circuit 108. A latching circuit formed by a pair of transistors Q2A and Q2B, which each receive their collector voltage from the control voltage Vcc through resistors R9 and R10 respectively is used to latch the switching control signal 116. The latched switching signal at circuit node 114 is then provided to the buffer transistors Q3A and Q3B through resistor R11. Combining setpoint 112 with the control signal 110 through resistor R17 sustains self-oscillatory behavior of the switching control circuit 106. Overvoltage protection is provided by coupling the switching control signal 116 to the driver output at terminal J3 through a pair of zener diodes Z1 and Z2 in series with resistor R8.

Control voltage Vcc is generated during normal operation by a charge pump circuit 120 including two capacitors C4 and C2, a pair of series connected diodes D3 and D4 and resistor R5. The charge pump circuit 120 receives power from a secondary winding T1B magnetically coupled to the boost inductor T1A. A zener diode Z3 maintains the control voltage Vcc at a steady level. When the LED driver circuit 100 starts, there is a time period before the charge pump circuit 120 begins to supply the control voltage Vcc. A start-up circuit 122 is included to provide control voltage Vcc during this start-up phase until the charge pump circuit 120 takes over. A MOSFET M2 receives a gate voltage through series connected resistor R4 and R4A and allows DC drive power at terminal J3 to flow through resistor R3 to the control voltage Vcc. Once the control voltage Vcc achieves its desired level, FET M2 turns off and control voltage Vcc is provided by the charge pump circuit 120.

In many LED applications or other DC driver applications it is desirable to have the driver provide supplemental power for additional features such as a cooling device which may be used to control the temperature of a LED lamp. In the exemplary LED drive circuit 100 illustrated in FIG. 1, a transformer winding T1A is used as boost energy storage element and a secondary winding T1B is used to provide power to the switching control circuit 106. In this configuration the transformer winding T1A, which in this example is referred to as a boost inductor, also acts as an EMI filter. Supplemental power is obtained by adding a third winding T1C magnetically coupled to the boost inductor T1A. However adding a third winding T1C, shown across terminals J5, J6, to power a cooling system or other load, can alter the characteristics of the boost inductor T1A causing the EMI filter band to change, which can adversely impact the EMI filtering characteristics of the boost inductor T1A.

Figure 2:
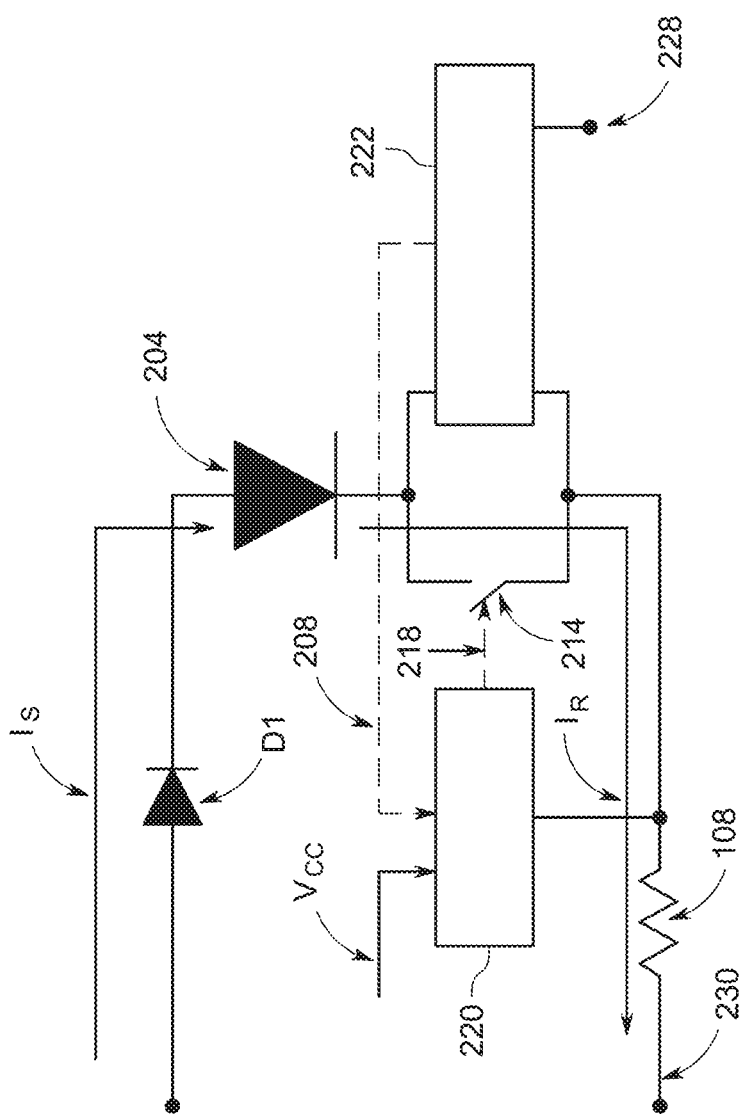
FIG. 2 illustrates a block diagram of one embodiment of a LED drive circuit incorporating aspects of the present disclosure.

Referring now to FIG. 2, the pictorial diagram illustrates one embodiment for providing supplemental power in a LED driver using a boost type topology circuit, such as the exemplary LED driver circuit 100 shown in FIG. 1 and described above. In this example, the LED supply current $I_S$ flows through freewheeling diode D1 and terminal J3 to an LED lamp assembly 204. The LED return current $I_R$ flows from the LED lamp assembly 204 through terminal J4 back into the LED driver circuit (not shown) through the current sensing circuit 108. A switch 214 is placed in series with the LED return current $I_R$ such that when the switch 214 is opened the LED return current $I_R$ is diverted through a supplemental power supply or circuit 222 and when the switch 214 is closed the LED return current $I_R$ bypasses the supplemental power circuit 222 and flows directly back to the LED driver circuit. Referring to FIG. 1, the LED return current $I_R$ passes through current sensing circuit 108.

Switch 214 may be any appropriate type of semiconductor or mechanical switch capable of efficiently switching the LED return current $I_R$ as required to regulate power delivered to the supplemental power circuit 222. A supplemental power control circuit 220 monitors the supplemental power circuit 222 through a voltage sensing signal 208 and provides a switching control signal 218 that opens and closes the switch 214. The switching control signal 218 is alternately opened and closed such that the supplemental supply voltage 228 is maintained at a generally constant level. Alternatively, the switch control signal 218 may be adapted to maintain the supplemental supply voltage 228 at any desired level including varying levels. The control voltage Vcc, which in one embodiment can be a low level control voltage, is received by the supplemental power control circuit 220 and is returned to the current sensing circuit 108. In certain embodiments it is advantageous to use the supplemental supply voltage 228 to provide the control voltage Vcc. FIG. 2 illustrates how the disclosed supplemental power generation method and apparatus may be applied to a boost type LED driver circuit; however those skilled in the art will readily recognize that the disclosed method and circuits may be applied in any type of LED driver circuit or other DC driver circuit without straying from the spirit and scope of the disclosed embodiments.

Figure 3:
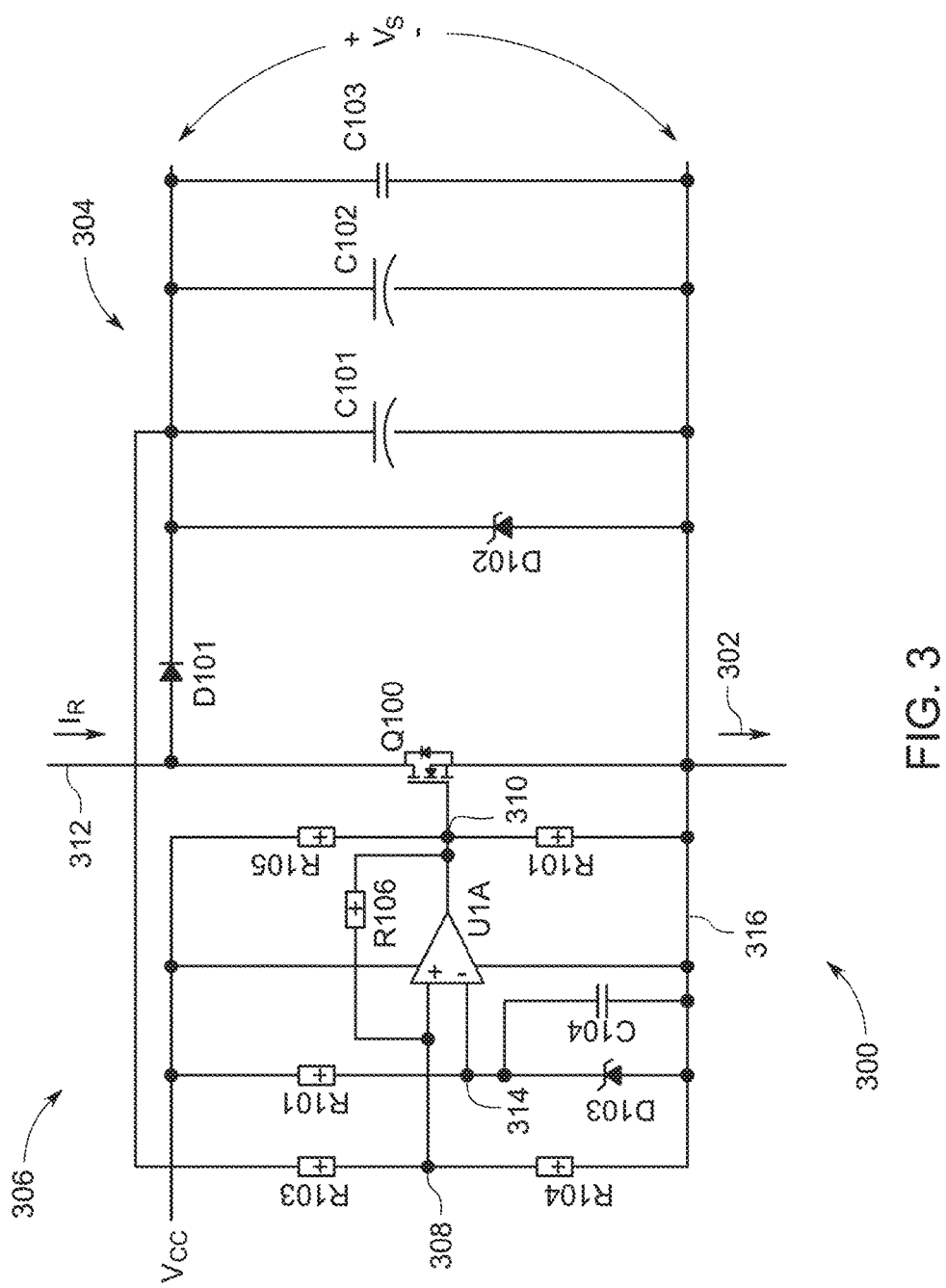
FIG. 3 illustrates a schematic diagram of one embodiment of a supplemental power supply incorporating aspects of the present disclosure.

FIG. 3 illustrates a schematic diagram of one embodiment of a circuit, generally indicated by numeral 300, for providing supplemental power in a LED driver circuit, such as LED driver circuit 100 of FIG. 1, or other type of DC current driver incorporating aspects of the present disclosure. In this example, a supplemental power switch Q100 is placed in series with the return current $I_R$ which is received at circuit node 312, such that when the supplemental power switch Q100 is turned on the return current $I_R$ passes through the supplemental power switch Q100 and exits at circuit node 302 where it returns to a DC driver circuit (not shown), such as the exemplary LED driver circuit 100 shown in FIG. 1. In the exemplary circuit illustrated in FIG. 3 the supplemental power switch Q100 is illustrated as an n-channel MOSFET, however any suitable type of semiconductor or mechanical switch that is capable of switching the return current $I_R$ at the desired frequencies may be advantageously used. A supplemental power control circuit 306 provides a switching signal 310 to control the supplemental power switch Q100 such that the DC return current $I_R$ is selectively diverted into a supplemental power circuit 304 or allowed to bypass the supplemental power circuit 304. When the supplemental power switch Q100 is opened, LED return current $I_R$ is diverted into the supplemental power circuit 304 which is connected in parallel with the supplemental switch Q100, where a pair of high capacity electrolytic capacitors C101 and C102 are connected in parallel with the supplemental supply voltage Vs such that they act to maintain and stabilize the supplemental voltage Vs. A lower value filter capacitor C103 is also connected in parallel with the supplemental voltage Vs and provides filtering of high frequency voltage fluctuations. A diode D101 has its anode connected to the drain of the supplemental power switch Q100 and its cathode connected to the positive side of the supplemental voltage Vs, thus preventing the supplemental voltage from discharging through the switch Q100 when the switch Q100 is opened. In this fashion opening the switch Q100 causes the return current to bypass the supplemental power circuit 304 or supply without discharging the supplemental supply voltage. In one embodiment, the zener diode D102 has its anode connected to the negative side of the supplemental voltage Vs and its cathode connected to the positive side of the supplemental voltage Vs thereby protecting the supplemental supply capacitors C101 and C102 from negative voltages. The output voltage Vs may be regulated by selectively closing and opening the supplemental power switch Q100 such that the DC return current $I_R$ is diverted to charge the capacitors C101 and C102 or allowed to bypass the supplemental power circuit 304 respectively.

The supplemental power control circuit 306 monitors the supplemental voltage Vs produced across the capacitors C101, C102 of the supplemental power circuit 304 and creates a switching control signal 310 to regulate the supplemental voltage Vs at a generally constant level. A control voltage Vcc is received by the control circuit 306 from any suitable source, such as for example, the control voltage Vcc produced by the exemplary DC driver circuit 100 illustrated in FIG. 1 and described above. Series connected resistors R101 and R105 are coupled between control voltage Vcc and circuit common 316 with the central node 310 connected to the gate of MOSFET Q100 to provide a current path for the switching signal 310. A non-inverting hysteretic comparator circuit is constructed from operational amplifier (op-amp) U1A and feedback resistor R106 and the op-amp U1A receives its operating power from control voltage Vcc. A reference voltage is created at the central node 314 of a series connected resistor R101 and capacitor C104 coupled between the control voltage Vcc and circuit common 316 and is applied to the inverting input of op-amp U1A. A zener diode D103 is coupled in parallel with capacitor C104. Supplemental voltage Vs is sensed by a resistor divider network including resistors R103 and R104 coupled between the supplemental voltage Vs and circuit common 316 such that a feedback voltage is created at circuit node 308. By applying the feedback voltage at circuit node 308 to the non-inverting input of op-amp U1A, the switching signal 310 will be turned on and off when the supplemental voltage Vs falls below or rises above, respectively, a desired value as determined by the reference voltage 314.

Use of a secondary winding, such as winding T1C as illustrated in FIG. 1, on the DC driver's boost inductor, which is magnetically coupled to the energy storage inductor T1A, may increase EMI emissions above levels allowed by government regulatory agencies. A supplemental power source coupled to a DC driver, such as LED driver circuit 100 of FIG. 1, by placing a supplemental power switch Q100 in series with the DC return current $I_R$ such that the LED return current $I_R$ can be selectively diverted into a supplemental power circuit 222, 306 as is illustrated in FIGS. 2 and 3 and described above, can provide supplemental power without increasing EMI emissions above regulatory limits. Supplemental power circuits such as those illustrated in FIGS. 3 and 4 and described above may be used to power a cooling device such as a synthetic jet cooling device or alternatively may be used to power smart controls or monitoring circuits or other desired functionality.

Figure 4:
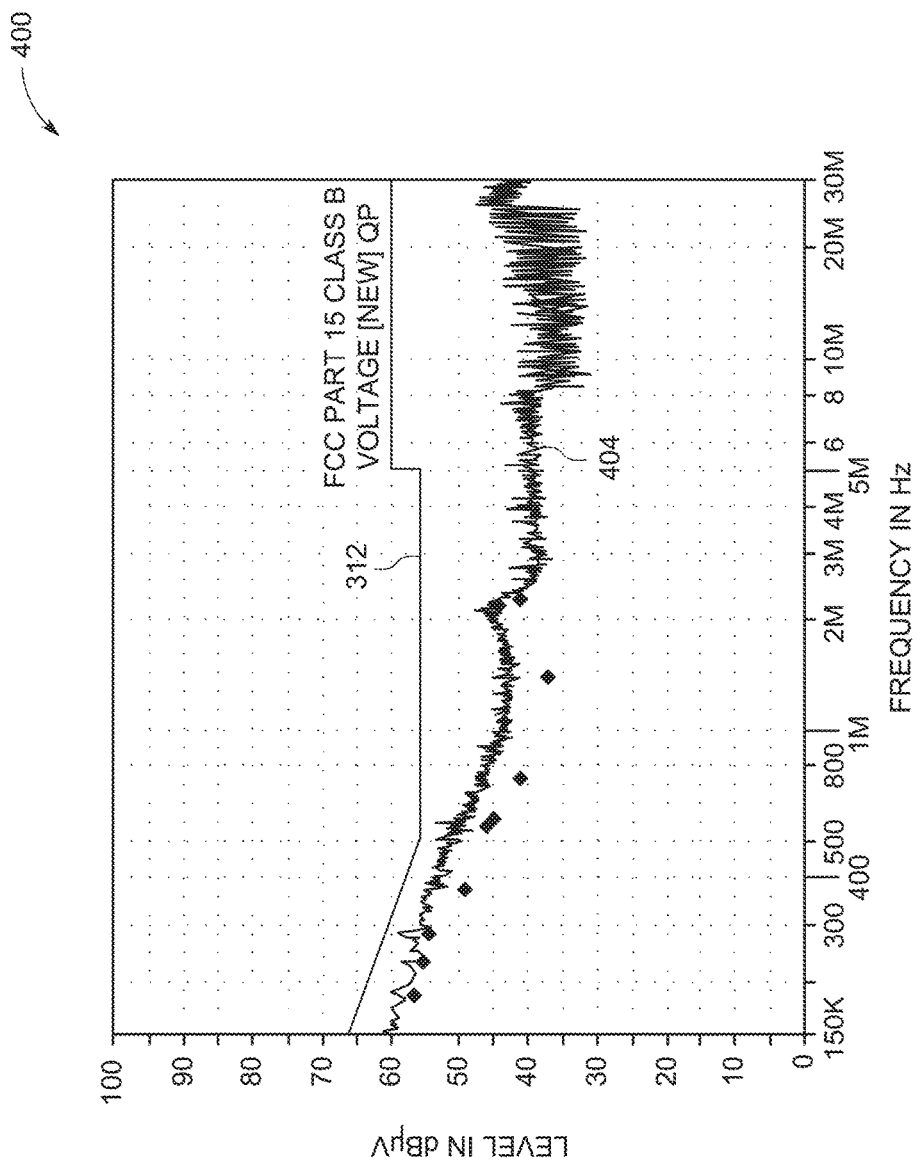
FIG. 4 illustrates a graph of EMI performance of one embodiment of a LED drive circuit incorporating aspects of the present disclosure.

FIG. 4 illustrates a graph of EMI emissions create by the supplemental power supply 300 illustrated in FIG. 3 when coupled to an exemplary DC driver such as the LED drive circuit 100 of FIG. 1. The graph 400 plots EMI emissions 404 in decibel-microvolts versus frequency in Hertz against one government standard 402, known as Part 15 Class B, published by the Federal Communications Commission (FCC) which is an independent agency of the United States Federal Government. As can be seen in the graph 400, the EMI emissions 404 produced by the exemplary supplemental power supply 300 remain below the limit set by the FCC throughout the entire spectrum from 150 kilohertz to 30 megahertz.

In addition to meeting regulatory limits, the disclosed exemplary supplemental power supply 300 results in a DC LED driver with desirable performance characteristics. Table 1 provides some operating values for an exemplary boost type LED driver including a supplemental supply 300 coupled to the LED return current $I_R$ as shown in FIG. 3. The supplemental supply in the example driver of Table 1 is used to drive a synthetic jet cooling device which is used to cool the LED lamp. The LED driver receives 23.96 watts of AC power (Power In) at 119.98 volts (Vin) root mean square (rms) and 0.203 amps (Iin) rms. The LED driver provides a high power factor (PF In) of 0.985 with a low total harmonic distortion (THD) of 15.9%. The LED driver produces 21.98 watts of DC power (Power Out) at 191.04 volts (Vdc Out) and 114.52 mili-amps (Idc Out) yielding an efficiency of 91.70%. The advantages of using a synthetic jet cooling device to cool an LED lamp can be seen in Table 2. The first row provides measurements made on a standard LED lamp five minutes after starting the lamp and the second row shows measurements made on the same lamp ten minutes after starting the lamp. Current used by the lamp increased by 30 milliamps resulting in a slight increase in power usage from 23.8 watts to 23.9 watts while the light output remains stable as shown by the measurements of Lumens, Xcolor, Ycolor and CCT.

TABLE 1

| Vin (rms) | Iin (rms) | Power In | PF In | Vdc Out | Idc Out | Power Out | Efficiency | THD |
|---|---|---|---|---|---|---|---|---|
| 119.98 | 0.203 | 23.96 | 0.985 | 191.04 | 114.52 | 21.98 | 91.70% | 15.9% |

TABLE 2

| | Volts | Amps | Watts | Lumens | Xcolor | Ycolor | CCT |
|---|---|---|---|---|---|---|---|
| After 5 min | 119.99 | 0.2016 | 23.8 | 1594.9 | .4378 | .3996 | 2949 |
| After 10 min | 119.99 | 0.2019 | 23.9 | 1581.3 | .4377 | .3994 | 2949 |

Figure 5:
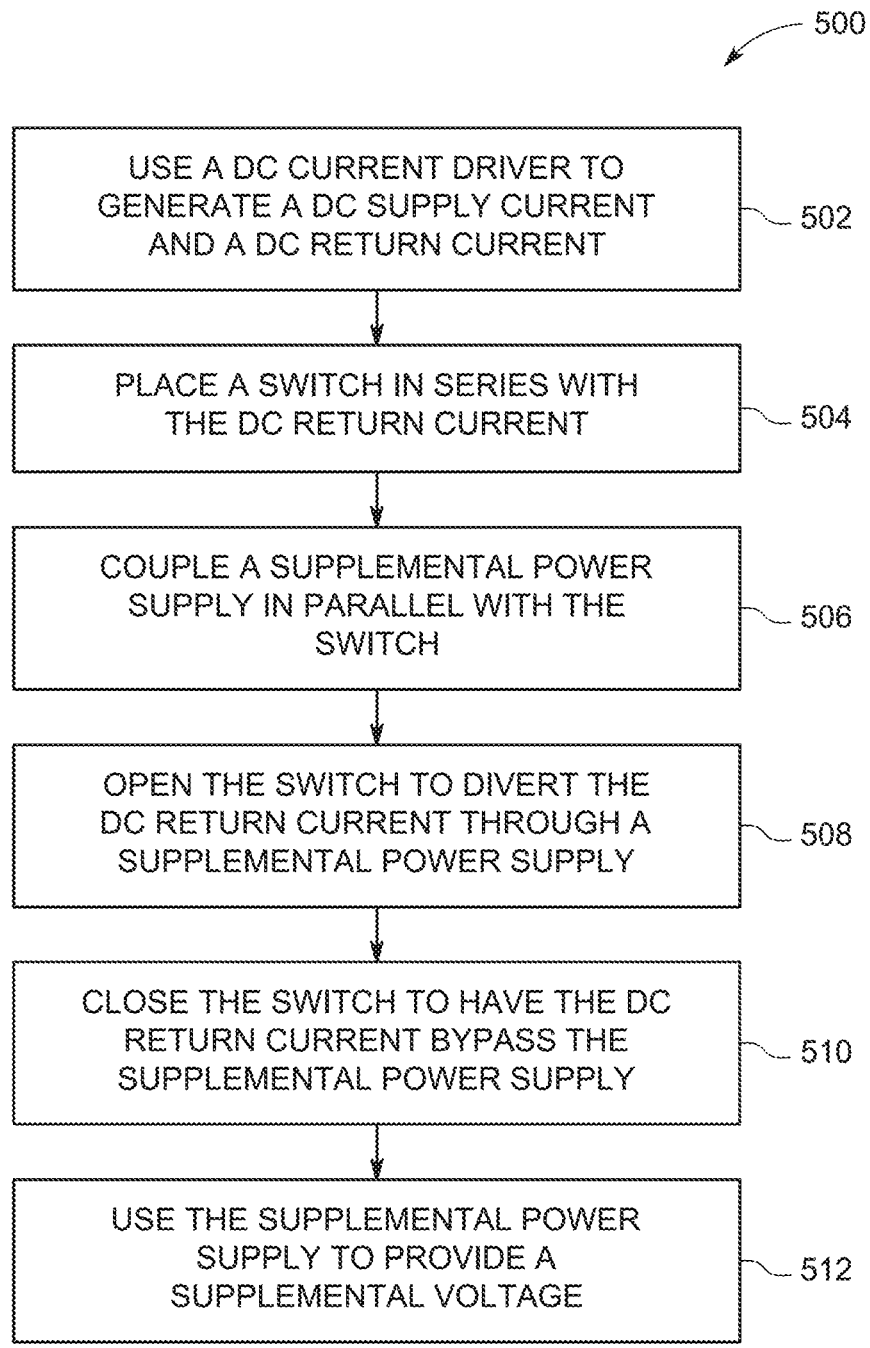
FIG. 5 illustrates a flowchart of one embodiment of a method for using LED drive current for supplemental power incorporating aspects of the present disclosure.
Figure 6:
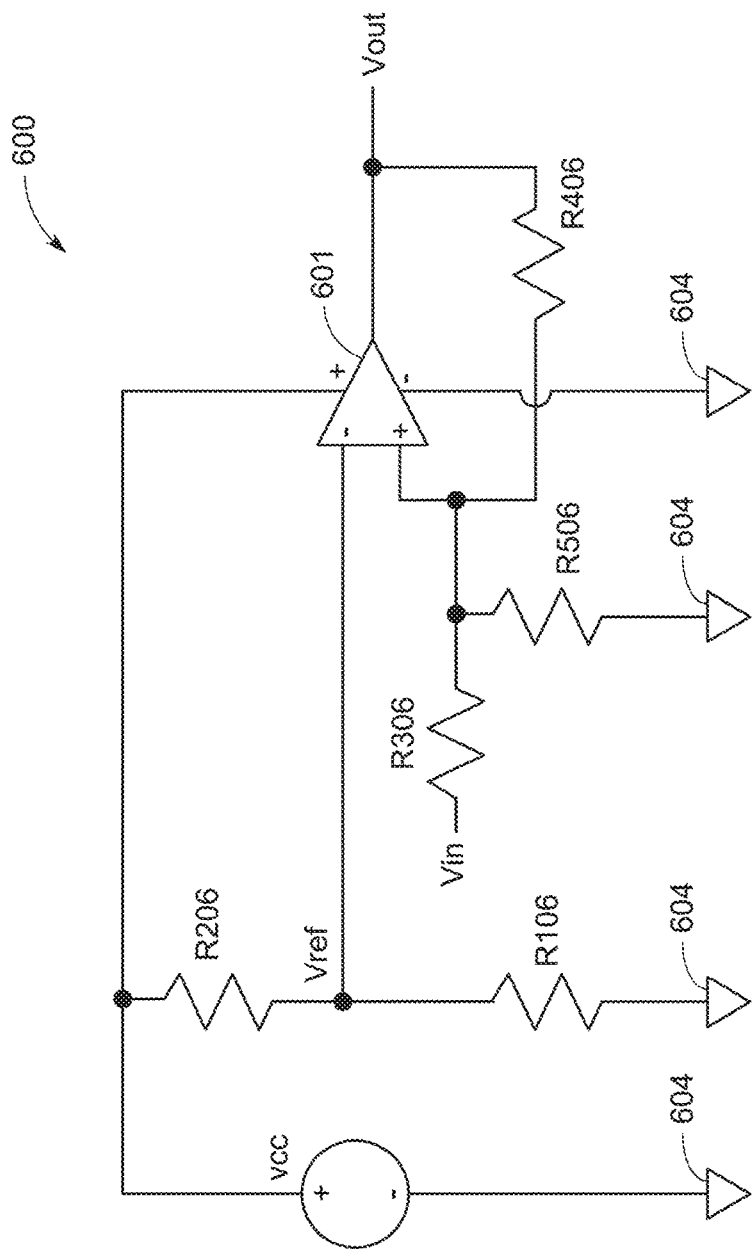
FIG. 6 illustrates a schematic diagram of one embodiment of a non-inverting hysteretic comparator circuit of the prior art.

FIG. 5 illustrates one embodiment of an exemplary method of generating a supplemental voltage in a DC current driver incorporating aspects of the present disclosure. The exemplary method may be used with a variety of DC current driver circuits such as for example the exemplary LED drive circuit illustrated in FIG. 1. The method includes using the LED drive circuit 100 of FIG. 1 to generate 502a DC supply current $I_S$ and DC return current $I_R$. The DC supply current $I_S$ may be used to drive a LED lamp assembly or other load requiring a generally constant DC current and the current flowing from the load back to the DC drive circuit is referred to herein as the DC return current $I_R$. A switch, such as switch 214 of FIG. 2, is placed 504 in series with the DC return current $I_R$ and may be advantageously placed between the load and the DC current driver such that the DC return current $I_R$ flows through the switch 214. A supplemental power supply, such as power supply 222 of FIG. 2, is coupled 506 in parallel with the switch 214 such that opening 508 the switch 214 causes the DC return current $I_R$ to be diverted through the supplemental power supply 222 before it returns to the DC current driver. Closing 510 the switch 214 causes the DC return current $I_R$ to bypass the supplemental power supply 222 and return directly to the DC driver. The DC return current $I_R$ that is diverted through the supplemental power supply 222 when the switch 214 is opened 508 can then be used to provide 512 a supplemental supply voltage for use by other circuits or devices. For example when the exemplary method 500 is used in a LED driver circuit 100, such as that shown in FIG. 1, the supplemental supply voltage may be used to power a synthetic jet cooling device adapted to lower the temperature of the LED lamp. In certain embodiments is desirable to use a diode to prevent the provided supplemental supply voltage from discharging when the switch 214 is closed 510. In one embodiment, this can be achieved by placing a diode, such as diode D1 of FIG. 2, between the positive side of the switch 214, which in certain embodiments would be the drain of an n-channel MOSFET, and the positive side of the provided supplemental supply voltage. In some applications it is desirable to use the DC supply current $I_S$ and DC return current $I_R$ to power a LED lamp. In these embodiments the DC supply current $I_S$ is provided to a LED lamp assembly and the current returning from the LED lamp assembly is the LED return current $I_R$.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A DC current driver, comprising:
a DC current drive circuit configured to provide a DC supply current to a load and receive a DC return current from the load through a terminal connected to a circuit common of the DC current drive circuit;
a switch coupled in series between the load and the terminal; and
a supplemental power supply coupled in parallel with the switch, wherein the supplemental power supply is configured to provide a supplemental voltage,
wherein opening the switch diverts the DC return current through the supplemental power supply and closing the switch causes the DC return current to bypass the supplemental power supply.
2. The driver of claim 1, wherein the supplemental power supply comprises a control circuit coupled to the supplemental voltage, the control circuit configured to open and close the switch to maintain the supplemental voltage at a desired level.
3. The driver of claim 2, wherein the control circuit is configured to maintain the supplemental voltage at a generally constant level.
4. The driver of claim 1, wherein the supplemental power supply comprises a capacitance configured to receive the diverted DC return current and a voltage of the capacitance is maintained proportional to the supplemental voltage.
5. The driver of claim 4, wherein the supplemental power supply comprises a diode connected in series with the capacitance, wherein the diode is configured to allow the DC return current to charge the capacitance when the switch is opened and to prevent the capacitance from discharging through the switch when the switch is closed.
6. The driver of claim 1, wherein the DC current drive circuit comprises a boost type switching regulator configured to maintain the DC supply current at a generally constant level.
7. The driver of claim 1, wherein the DC supply current comprises a LED supply current, and the DC return current comprises a LED return current.
8. The driver of claim 1, further comprising a current sensing circuit coupled in series with the switch and configured to provide a current sensing voltage related to an amount of the DC return current.
9. An LED lighting apparatus, comprising:
an LED lamp comprising one or more light emitting diodes;

a driver circuit coupled to the LED lamp and configured to provide an LED supply current to the LED lamp and to receive an LED return current from the LED lamp through a terminal connected to a circuit common of the driver circuit;

a switch coupled in series between the LED lamp and the terminal; and a supplemental power supply coupled in parallel with the switch, wherein the supplemental power supply is configured to receive the LED return current and produce a supplemental voltage, wherein opening the switch causes the LED return current to flow through the supplemental power supply and closing the switch causes the LED return current to bypass the supplemental power supply.

10. The apparatus of claim 9, wherein the LED lamp comprises one or more LED elements.

11. The apparatus of claim 9, comprising a cooling device electrically coupled to the supplemental power supply.

12. The apparatus of claim 11, wherein the cooling device is a synthetic jet cooling device.

13. The apparatus of claim 9, wherein the supplemental power supply comprises a control circuit coupled to the supplemental voltage, the control circuit being configured to open and close the switch to maintain the supplemental voltage at a desired level.

14. The apparatus of claim 9 wherein the driver circuit comprises a boost type switching regulator.

15. A method for providing a supplemental voltage in a DC current driver, the method comprising:

producing a DC supply current for a load with the DC current driver;

receiving a DC return current from the load through a terminal connected to a circuit common of the DC current driver with the DC current driver;

opening a switch that is in series between the load and the terminal to divert the DC return current through a supplemental power supply circuit coupled in parallel with the switch;

closing the switch to have the DC return current bypass the supplemental power supply circuit; and using the supplemental power supply circuit to generate a supplemental voltage from the DC return current.

16. The method of claim 15, wherein a diode is used to prevent the supplemental supply voltage from discharging through the switch.

17. The method of claim 15, further comprising:

monitoring the supplemental voltage and opening and closing the switch to maintain the supplemental voltage at a generally constant level.

18. The method of claim 15, comprising:

providing the DC supply current to a LED lamp and receiving the DC return current from the LED lamp.

19. The method of claim 15, wherein producing a DC supply current comprises using a boost type switching regulator to produce the DC supply current and receiving the DC return current comprises using a boost type switching regulator to receive the DC return current.

20. The method of claim 19, where receiving the DC return current comprises using a current sensing circuit to monitor the amount of DC return current and operating the boost type switching regulator based at least in part on the monitored amount of DC return current such that the DC supply current is maintained at a generally constant level.

* * * * *